(12) United States Patent
Udagawa et al.

(10) Patent No.: US 11,549,537 B2
(45) Date of Patent: Jan. 10, 2023

(54) ARTICLE OF FURNITURE AND METHOD OF INSTALLING SAME

(71) Applicant: Knoll, Inc., East Greenville, PA (US)

(72) Inventors: Masamichi Udagawa, New York, NY (US); Sigrid Moeslinger, New York, NY (US); Mark Jones, East Greenville, PA (US); James Harrison McKenzie, East Greenville, PA (US)

(73) Assignee: Knoll, Inc., East Greenville, PA (US)

( * ) Notice: Subject to any disclaimer, the term of this patent is extended or adjusted under 35 U.S.C. 154(b) by 0 days.

(21) Appl. No.: 17/349,417

(22) Filed: Jun. 16, 2021

(65) Prior Publication Data
US 2021/0396258 A1 Dec. 23, 2021

Related U.S. Application Data

(60) Provisional application No. 63/046,886, filed on Jul. 1, 2020, provisional application No. 63/041,152, filed on Jun. 19, 2020.

(51) Int. Cl.
*F16B 12/20* (2006.01)
*F16B 7/22* (2006.01)
(Continued)

(52) U.S. Cl.
CPC ........ *F16B 12/2009* (2013.01); *F16B 7/0433* (2013.01); *F16B 7/22* (2013.01);
(Continued)

(58) Field of Classification Search
CPC ......... A47B 13/02; A47B 13/06; A47B 21/06; A47B 2021/066; B65D 90/0013; F16B 7/0433; F16B 7/187; F16B 7/22; F16B 12/2009; F16B 12/28; F16B 12/32; F16B 12/40; F16B 21/02; F16B 2200/20; F16B 2200/205; Y10S 403/12; Y10S 403/13; Y10T 403/7005; Y10T 403/7009;
(Continued)

(56) References Cited

U.S. PATENT DOCUMENTS 2,821,450 A 1/1958 Knoll
4,248,325 A 2/1981 Georgopoulos
(Continued)

FOREIGN PATENT DOCUMENTS

DE 9417856 U1 * 1/1995 ............ F16B 7/0433
DE 10315045 A1 * 10/2004 .............. F16B 21/02
(Continued)

*Primary Examiner* — Josh Skroupa
(74) *Attorney, Agent, or Firm* — Buchanan Ingersoll & Rooney PC

(57) ABSTRACT

An article of furniture can include an upper beam member, a first side member, a second side member, and a plurality of attachment bracket members connecting the first side member to the upper beam member adjacent a first side of the upper beam member and also connecting the second side member to the upper beam member adjacent a second side of the upper beam member. Each attachment bracket members can have a body and a plurality of arms extending from the body. The arms can include a first and second top arms, first and second intermediate arms, and first and second bottom arms. The arms can be positioned to define channels.

20 Claims, 6 Drawing Sheets

(51) Int. Cl.
*F16B 7/04* (2006.01)
*F16B 21/02* (2006.01)
*A47B 21/06* (2006.01)

(52) U.S. Cl.
CPC ........ *F16B 21/02* (2013.01); *A47B 2021/066* (2013.01); *Y10T 403/7005* (2015.01)

(58) Field of Classification Search
CPC ......... Y10T 403/7015; Y10T 403/7043; Y10T 403/7111; Y10T 403/7117; Y10T 403/7123
USPC ....... 403/348, 350, 353, 363, 386, 387, 388, 403/DIG. 12, DIG. 13
See application file for complete search history.

(56) References Cited

U.S. PATENT DOCUMENTS

| | | | |
|---|---|---|---|
| 4,325,597 A | 4/1982 | Morrison | |
| 4,382,642 A | 5/1983 | Burdick | |
| 4,546,889 A | 10/1985 | Schoumaker et al. | |
| 4,567,698 A | 2/1986 | Morrison | |
| 4,604,955 A | 8/1986 | Fleischer et al. | |
| 5,086,597 A | 2/1992 | Kelley et al. | |
| 5,155,960 A * | 10/1992 | Shaanan | F16B 21/02 403/348 |
| 5,224,429 A | 7/1993 | Borgman et al. | |
| 5,287,909 A | 2/1994 | King et al. | |
| 5,309,686 A | 5/1994 | Underwood et al. | |
| 5,328,260 A | 7/1994 | Beirise | |
| 5,408,940 A | 4/1995 | Winchell | |
| 5,539,599 A * | 7/1996 | Wilder | G11B 23/0316 403/381 |
| 5,562,052 A | 10/1996 | Glashouwer et al. | |
| 5,598,789 A | 2/1997 | Jonker | |
| 5,609,435 A * | 3/1997 | Nomura | F16B 7/0433 403/294 |
| 5,675,946 A | 10/1997 | Verbeek et al. | |
| 5,680,893 A | 10/1997 | Neer | |
| 5,706,739 A | 1/1998 | Shaheen et al. | |
| 5,715,761 A | 2/1998 | Frattini | |
| 5,881,979 A | 3/1999 | Rozier, Jr. et al. | |
| 5,906,420 A | 5/1999 | Rozier, Jr. et al. | |
| 5,941,182 A | 8/1999 | Greene | |
| 5,943,966 A | 8/1999 | Machado et al. | |
| 5,966,879 A | 10/1999 | Verbeek et al. | |
| 6,000,180 A | 12/1999 | Goodman et al. | |
| 6,002,613 A | 12/1999 | Cloud et al. | |
| 6,029,587 A | 2/2000 | Rozier, Jr. et al. | |
| 6,067,762 A | 5/2000 | Greer et al. | |
| D427,783 S | 7/2000 | Luedke | |
| 6,167,664 B1 | 1/2001 | Reuter et al. | |
| 6,367,213 B1 | 4/2002 | Reuter et al. | |
| D457,359 S | 5/2002 | Chan | |
| 6,389,988 B1 | 5/2002 | Frattini | |
| D458,040 S | 6/2002 | Stannis et al. | |
| 6,536,357 B1 | 3/2003 | Hiestand | |
| 6,546,880 B2 | 4/2003 | Agee | |
| 6,896,028 B2 | 5/2005 | Brennan | |
| 7,310,918 B1 | 12/2007 | Reuter et al. | |
| 7,444,922 B2 * | 11/2008 | Harashima | F16B 7/0433 92/88 |
| 7,789,025 B2 | 9/2010 | Michaud, II et al. | |
| 7,871,280 B2 * | 1/2011 | Henriott | A47B 21/06 108/50.02 |
| 7,942,601 B2 * | 5/2011 | Bohman | B65D 90/0013 403/343 |
| 8,056,489 B2 | 11/2011 | Nielsen | |
| D653,862 S | 2/2012 | Hairston | |
| 8,132,371 B2 | 3/2012 | Golinski et al. | |
| 8,206,054 B1 * | 6/2012 | Burnett | F16B 12/20 403/DIG. 13 |
| 8,256,359 B1 | 9/2012 | Agee | |
| 8,347,796 B2 | 1/2013 | Udagawa et al. | |
| 8,365,798 B2 | 2/2013 | Feldpausch et al. | |
| 8,667,909 B2 | 3/2014 | Ruzicka | |
| 8,857,113 B2 * | 10/2014 | Zhang | F16B 7/187 52/173.3 |
| 9,185,973 B2 | 11/2015 | Udagawa et al. | |
| 9,238,550 B2 * | 1/2016 | Askerdal | F16B 2/14 |
| 9,265,340 B2 | 2/2016 | Krusin et al. | |
| 9,585,468 B2 | 3/2017 | Udagawa et al. | |
| 9,730,513 B2 | 8/2017 | Udagawa et al. | |
| D796,216 S | 9/2017 | Rockwell et al. | |
| D800,459 S | 10/2017 | Rockwell et al. | |
| 9,920,520 B2 | 3/2018 | Udagawa et al. | |
| 9,926,957 B2 * | 3/2018 | Zhang | F16B 7/18 |
| 10,390,611 B2 | 8/2019 | Lee | |
| 10,413,063 B2 | 9/2019 | Lee | |
| 10,780,844 B2 * | 9/2020 | Doan | F16B 21/02 |
| 11,047,154 B2 * | 6/2021 | Kim | B65D 90/0013 |
| 11,167,682 B2 * | 11/2021 | Helou, Jr. | B65D 90/0026 |
| 2009/0080999 A1 * | 3/2009 | Dunn | F16B 21/02 411/500 |
| 2012/0126072 A1 | 5/2012 | Pettersson | |
| 2012/0304441 A1 | 12/2012 | Henriott | |
| 2013/0204438 A1 | 8/2013 | Hjelm | |
| 2017/0226749 A1 | 8/2017 | Fjetland | |
| 2019/0039824 A1 * | 2/2019 | Hsieh | F16B 21/02 |
| 2019/0365089 A1 | 12/2019 | Lee | |
| 2021/0088061 A1 * | 3/2021 | Jones | F16B 21/02 |

FOREIGN PATENT DOCUMENTS

| | | | | |
|---|---|---|---|---|
| DE | 102018105532 B3 * | 7/2019 | ......... | B65D 90/0013 |
| WO | WO-2010057324 A1 * | 5/2010 | ............ | F16B 7/0433 |

* cited by examiner

ARTICLE OF FURNITURE AND METHOD OF INSTALLING SAME

CROSS-REFERENCE TO RELATED APPLICATION

The present application claims priority to U.S. Provisional Patent Application No. 63/046,886, which was filed on Jul. 1, 2020 and U.S. Provisional Patent Application No. 63/041,152, which was filed on Jun. 19, 2020. The entirety of U.S. Provisional Patent Application No. 63/046,886 is incorporated by reference herein. The entirety of U.S. Provisional Patent Application No. 63/041,152 is incorporated by reference herein.

FIELD

The present innovation relates to articles of furniture that can be configured to facilitate the routing of electricity and/or data wiring while also providing a support structure to facilitate positioning of other articles (e.g. privacy screens, displays, shelving, etc.). The present innovation also relates to a method of installing articles of furniture at a particular work space (e.g. an office building, floor of a building, etc.).

BACKGROUND

Examples of articles of furniture can be appreciated from U.S. Patent Application Publication Nos. 2019/0365089, 2013/0204438 and 2012/0126072 and U.S. Pat. Nos. 10,413,063, 10,390,611, 9,585,468, 9,265,340, 9,185,973, 8,667,909, 8,256,359, 8,056,489, 6,546,880, 6,536,357, 6,389,988, 6,029,587, 5,941,182, 5,881,979, 5,715,761, 5,706,739, 5,598,789, 5,562,052, 5,224,429, 5,408,940, and 4,604,955. Examples of other types of articles of furniture can be appreciated from U.S. Pat. Nos. 9,920,520, 8,365,798, 7,789,025, 7,310,918, 6,896,028, 6,367,213, 6,002,613, 6,000,180, 5,966,879, 5,675,946, 5,680,893, 5,287,909, 4,325,597, 4,248,325, and 2,821,450, U.S. Design Patent Nos. D800,459, D796,216, D653,862, D458,040, D457,359, and D427,783 and U.S. Patent Application Publication Nos. 2017/0226749 and 2012/0304441.

Examples of furniture systems that can be used in organizing or decorating interior spaces of buildings such as offices or homes can be appreciated from U.S. Pat. Nos. 9,730,513, 8,347,796, 8,132,371, 6,167,664, 6,067,762, 5,943,966, 5,906,420, 5,328,260, 5,309,686, 5,086,597, 4,567,698, 4,546,889, 4,382,642, 4,325,597, and 2,821,450.

SUMMARY

We have determined that there is a need for articles of furniture to facilitate the adjustment of the positioning and configuration of different work stations within a work space, such as an office building, floor of an office building, or room of an office. For instance, the distribution of power and/or data wiring to different work stations spaced apart from each other and defined by use of cubicle partitions or privacy screens can limit how a work space can be adjusted after it is organized and setup. We determined that a new type of article of furniture can be developed to help provide a device for the distribution of electricity and/or data wiring while also providing a support for positioning of other articles (e.g. privacy screens, displays, shelving) for the creation of spaced apart work spaces within an office or the like that can also be more easily adapted to account for changing needs of personnel who work in the work space. Embodiments of our article can allow for the arrangement of furniture to define different work spaces in a work area (e.g. different work stations having their own tables or desks in different spaced arrangements) while also permitting those work spaces to be more easily adjusted in position and arrangement to account for the changing needs of the work area.

For example, we provide embodiments of an article of furniture that can be configured to allow for a toolless installation via use of one or more attachment bracket members (e.g. use of a mechanical tool may not be needed for installation). In other embodiments, a wrench or channel locks tool may be used to help a user grip and twist the attachment bracket members for installation of the article.

Embodiments of the article of furniture can be configured to facilitate the distribution of power and/or data wiring to different articles (e.g. height adjustable tables or desks, computers, telephones, lighting, displays, etc.) as well as support one or more articles (e.g. privacy screens, shelving, displays, etc.) to help define different work areas for personnel within an office building, room of an office, or the like. The article can be configured to be mobile or otherwise easily moved after installation in a particular location in the work area for allowing the arrangement of furniture in the work area to be adjusted more easily to meet changing needs for personnel who may work in the work area (e.g. an office, a floor of a building, etc.).

In some embodiments, an article of furniture can include an upper beam member, a first side member, and a second side member. The article can also include a plurality of attachment bracket members connecting the first side member to the upper beam member adjacent a first side of the upper beam member and also connecting the second side member to the upper beam member adjacent a second side of the upper beam member.

In some embodiments, the attachment bracket members can be configured to be coupled to the upper beam member via a toolless attachment mechanism. The attachment bracket members can also be configured to be coupled to the first and second side members via a toolless attachment mechanism. In some embodiments, the attachment mechanism can be configured so separate fasteners are also not needed for attachment of the attachment bracket members to the upper beam member and separate fasteners are also not needed for attachment of the side members to the attachment bracket members (e.g. attachments can be performed without use of a mechanical tool and do not require use of fasteners such as bolts, rivets, nails, or screws).

In some embodiments, the attachment bracket members each have a body having a top projection for insertion into an inner groove of the upper beam member so rotation of the top projection interlocks the top projection within the inner groove. The body can also include a plurality of arms extending from the body. The arms can include a first top arm extending outwardly, a second top arm extending outwardly in a direction that is opposite the first top arm, a first intermediate arm extending outwardly that is positioned below the first top arm to define a first upper channel, a second intermediate arm extending outwardly that is positioned below the second top arm to define a second upper channel, a first bottom arm extending outwardly that is positioned below the first intermediate arm to define a first bottom channel, and a second bottom arm extending outwardly that is positioned below the second intermediate arm to define a second bottom channel. A distal end portion of the first top arm can have teeth to interlock with teeth of an upper projection of the first side member. A distal end portion of the second top arm can have teeth to interlock with teeth of an upper projection of the second side member. A distal end portion of the first intermediate arm can have teeth to interlock with teeth of a bottom projection of the first side member. A distal end portion of the second intermediate arm can have teeth to interlock with teeth of a bottom projection of the second side member. The utilization of interlocking teeth can facilitate toolless attachment of the first and second side members to each of the attachment bracket members that also does not require the use of separate fasteners (e.g. screws, bolts, rivets, nails, staples, etc.) and/or adhesive and/or welding.

In some embodiments of the article, the upper beam member can be sized and configured to receive an upper lip of an upper projection of the first side member to define a gap between a bottom of the upper beam member and the upper lip of the first side member. The upper beam member is sized and configured to receive an upper lip of an upper projection of the second side member to define a gap between a bottom of the upper beam member and the upper lip of the second side member.

Embodiments can also include outlets. For instance, outlets can be positioned in the first side member and outlets can be positioned in the second side member. The outlets can be configured for transmission of electricity and/or data (e.g. be power outlets, be Ethernet port outlets, be universal serial bus (USB) outlets, etc.).

The article of furniture can also include other features. For instance, there can be a base or plurality of legs to support the upper beam member above a floor. Feet can be attached to the legs. The feet can be glides, castors, or other types of feet. The base can alternatively include a storage unit. In some embodiments, the legs can be configured to also function as a cable shroud.

The attachment bracket members can be structured to include an integral body comprised of polymeric material. In other embodiments, it is contemplated that the body can be comprised of a composite material, a metal, or other type of material.

A method of installing an article of furniture is also provided. Embodiments of the method can be configured to install an embodiment of an article of furniture disclosed herein, for example. Some embodiments of the method can include providing an upper beam member having a top, a first side, a second side opposite the first side, and a bottom. The bottom can define an inner groove that is in communication with a lower mouth. The method can also include positioning a top projection of an attachment bracket member through the lower mouth so that the top projection is positioned within the inner groove of the upper beam member and rotating the attachment bracket member while the top projection is within the inner groove in a first rotational attachment direction to interlock the top projection within the inner groove to prevent the top projection from passing through the lower mouth.

Embodiments of the method can also include other steps. For instance, the method can also include attaching a first side member to the attachment bracket member adjacent to the first side of the upper beam member. Embodiments of the method can also include attaching a second side member to the attachment bracket member adjacent to the second side of the upper beam member. Embodiments of the method can also include routing wiring along the attachment bracket member.

In some embodiments, the rotating of the attachment bracket member while the top projection is within the inner groove in the first rotational attachment direction cam be performed without use of a mechanical tool and the attaching of the first side member and also the second side member to the attachment bracket members can performed without use of a mechanical tool.

Other details, objects, and advantages of the invention will become apparent as the following description of certain exemplary embodiments thereof and certain exemplary methods of practicing the same proceeds.

BRIEF DESCRIPTION OF THE DRAWINGS

Exemplary embodiments of an article of furniture and exemplary embodiments of components of the article and attachment bracket member are shown in the accompanying drawings and certain exemplary methods of making and practicing the same are also illustrated therein. It should be appreciated that like reference numbers used in the drawings may identify like components.

DETAILED DESCRIPTION OF EXEMPLARY EMBODIMENTS

Figure 1:
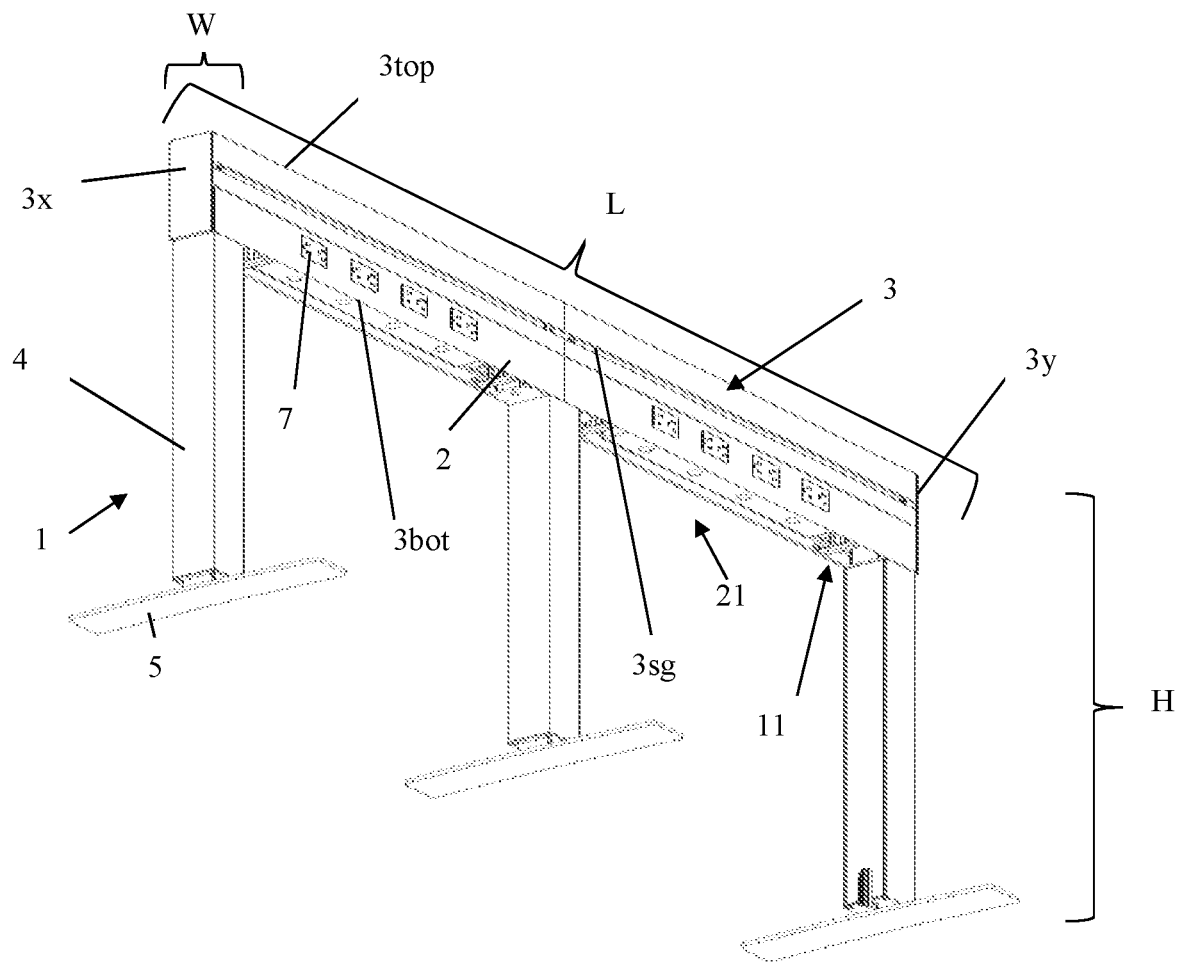
FIG. 1 is a perspective view of a first exemplary embodiment of an article of furniture configured to facilitation power and/or data wiring as well as supporting the positioning of other articles.
Figure 2:
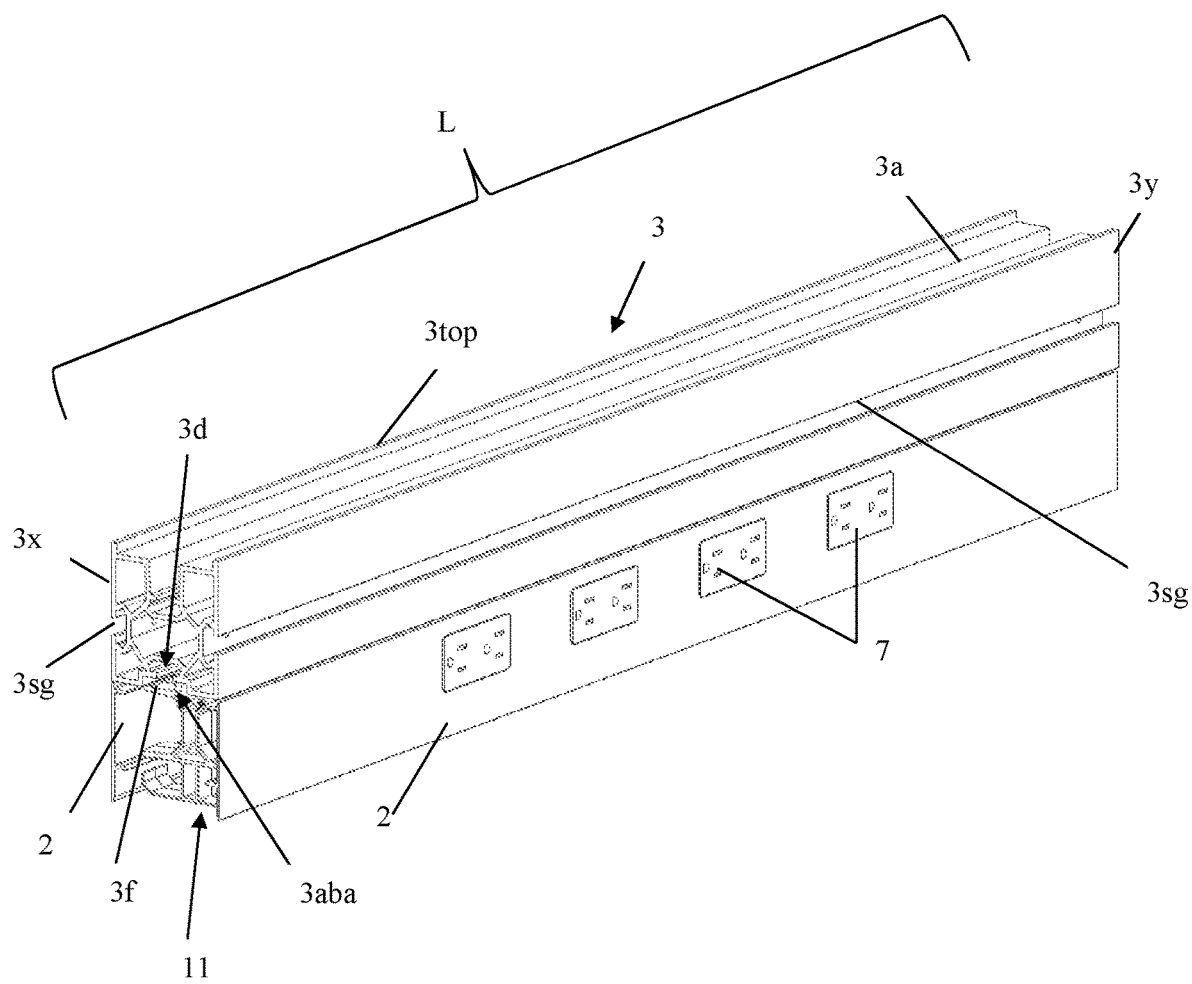
FIG. 2 is a fragmentary view of the first exemplary embodiment of the article illustrating an exemplary upper beam member 3 connected to an outer side member 2 shown in FIG. 1.

Referring to FIGS. 1-7 an article of furniture 1 can include an upper beam member 3 that is supported by one or more legs 4, a base that includes one or more legs or other structure (e.g. a storage unit, a cabinet, etc.). Each leg 4 can be configured for contacting a floor or otherwise supporting the upper beam member 3 above a floor. In some embodiments, each leg 4 can include a foot 5 (e.g. a castor, a glide, a floor contacting support configured to support the leg so the leg can extend vertically in an upright position to support the upper beam member 3, etc.).

The article of furniture 1 can have a length L. The length L of the upper beam member 3 can define most of the length of the article or the entirety of the length of the article in some embodiments. The article can also have a width W and a height H. The legs 4 can help define the height of the article and the width of the upper beam member 3 and/or the legs 4 can define a width W of the article. In some embodiments, the feet 5 can define the widest dimension of the width W of the article.

The upper beam member 3 can have a top 3*top*, a bottom 3*bot* opposite its top 3*top*, a first end 3*x* and a second end 3*y*. The top 3*top* can have a first aperture 3*a* and the bottom 3*bot* can have an attachment bracket aperture 3*aba*. The first aperture 3*a* of the top 3*top* can be configured to facilitate attachment to at least one display and/or one or more privacy screen bodies that may be positioned above the upper beam member 3 to help define a particular work space and/or to provide a display that can be connected to a user device (e.g. computer, laptop, tablet, smart phone) that may be positioned near the article (e.g. on a desktop or tabletop located near the article 1 in a work space the article helps define).

The attachment bracket aperture 3*aba* defined in the bottom of the upper member 3 can include a lower mouth 3*f* that is in communication with an inner groove 3*d*. The lower mouth 3*f* can be below the inner groove 3*d*. The inner groove 3*d* and lower mouth 3*f* can extend along the entirety of the length of the bottom of the upper beam member or may extend along a substantial portion of the length of the bottom of the upper beam member 3 (e.g. at least 50% of the length of the bottom of the upper beam member 3, at least 75% of the length of the bottom of the upper beam member 3, at least 90% of the length of the bottom of the upper beam member 3, between 50% and 90% of the length of the bottom of the upper beam member 3, etc.).

A first side 3*b* of the upper beam member 3 can extend from the first end 3*x* to the second end 3*y* between the top 3*top* and bottom 3*bot* of the upper beam member. A second side 3*c* can be opposite the first side 3*b*. The second side 3*c* of the upper beam member 3 can extend from the first end 3*x* to the second end 3*y* between the top and bottom of the upper beam member as well. The first and second sides 3*b* and 3*c* can be considered front and rear sides when the first and second ends 3*x* and 3*y* are considered left and right sides. The first and second sides 3*b* and 3*c* can alternatively be considered left and right sides when the first and second ends 3*x* and 3*y* are considered to be the front and rear sides of the upper beam member 3.

The article 1 can also include side members 2 that are positioned below the first and second sides 3*b* and 3*c* of the upper beam member 3 adjacent a lower opening 3*d* of the upper beam member via attachment bracket members 11. The side members 2 can be considered cutouts or plate members in some embodiments. Each side member 2 can have a length that corresponds to a length of the upper beam member 3 for extending along the length of the upper beam member 3 adjacent the bottom 3*bot* of the upper beam member 3. A first side member 2 can be attached to the upper beam member 3 to be positioned below the first side 3*b* of the upper beam member 3 and a second side member 2 can be attached to the upper beam member 3 to be positioned below the second side 3*c* of the upper beam member 3.

Each side member 2 can be positioned so the side member 2 is below a side groove 3*sg* defined in the body of the upper beam member 3 (e.g. the first side member 2 can be below a side groove 3*sg* of the first side 3*b* and the second side member 2 can be below the side groove 3*sg* of the second side 3*c*). Each side groove 3*sg* can extend along a length of the first side 3*b* or second side 3*c* of the upper beam member 3 between its first and second ends 3*x* and 3*y*. Each side groove 3*sg* can be configured to facilitate attachment of one or more devices to the upper beam member (e.g. shelving, a privacy screen, etc.).

Each side member 2 can have one or more cutouts defined therein for positioning of outlets 7 in the side member so that each outlet can be connected to wiring that is passed along and under the upper beam member 3 via the attachment bracket members 11 that are positioned to connect the side members 2 to the upper beam member 3. Each outlet 7 can be an electrical outlet, a data transmission outlet (e.g. an Ethernet connection port, etc.), or a combination of electrical outlets and data communication outlets (e.g. an outlet for electrical plugs and also universal serial bus (USB) plugs, electrical outlets, USB outlets and Ethernet connection ports, etc.).

The positioning and configuration of an exemplary embodiment of the attachment bracket members 11 may best be appreciated from FIGS. 3-7. A plurality of these attachment bracket members 11 can be attached to the upper beam member 3 via the attachment bracket aperture 3*aba* defined in the bottom of the upper member 3. For instance, each attachment bracket member 11 can have a body that includes a top projection 11*a* that is sized and configured to be inserted through the lower mouth 3*f* and then into the inner groove 3*d*. The top projection 11*a* can then be sized and configured so that the body of the attachment bracket member 11 can be rotated or twisted in a first rotational attachment direction RA (see e.g. exemplary attachment process shown in FIG. 7) after the top projection 11*a* is within the inner groove 3*d* to alter the orientation of the projection 11*a* within the inner groove 3*d* so that ends of the projection 11*a* contact with sidewalls of the upper beam member 3 that define the inner groove 3*d* for engagement with the upper beam member 3 within the inner groove 3*d* for attachment of the attachment bracket member 11 and the upper beam member 3. This attachment can be done by hand so that no tool is needed (e.g. the attachment is a toolless attachment and also a fastenerless attachment as no screws, bolts, or nails etc. are needed).

In other embodiments, a user may utilize a wrench, channel locks, pliers, or other type of tool to use the tool to grasp the body of the attachment bracket member 11 for twisting the attachment bracket member 11 to rotate the projection 11*a* within the inner groove 3*d* in the first rotational attachment direction RA. In such embodiments, use of a tool to assist in the rotation of the body of the attachment bracket member 11 can help avoid the user's hand being hurt and allow the attachment to occur more easily. Such an attachment process may not require any fasteners and can be considered a fastenerless attachment as no fasteners are needed or used for the attachment (e.g. the attachment is fastenerless as no screws, bolts, or nails etc. are needed).

The top projection 11*a* can have a length that extends between its opposite ends and be sized and shaped so that the top projection 11*a* can be oriented by motion of the body of the attachment bracket member 11 to pass into the inner groove 3*d* and then be rotated so that the top projection can engage the upper beam member 3 and be retained within the inner groove 3*d* for being attached to the upper beam member 3 without requiring use of a mechanical tool and without requiring use of any fasteners for the attachment of the attachment bracket member 11 to the upper beam member 3 (though a tool can be used in some embodiments if needed as discussed herein as well).

For instance, the top projection 11*a* can be configured so that the body of the attachment bracket member 11 can be rotated so that the top projection 11*a* is oriented to be aligned with the lower mouth 13*f* so it be can passed through the mouth 13*f* and into the inner groove 3*d* above the lower mouth 13f and, once in that position, be rotated in the first rotational attachment direction RA so that the length of the projection 11a extends transverse to the lower mouth 13f so that the top projection 11a is no longer aligned with the lower mouth 13f, contacts the upper beam member that defines the inner groove above opposite sides of the lower mouth 13f, and is locked into the inner groove 3d and not able to pass out of the lower mouth 13f by contacting portions of the upper beam member that define the sides of the inner grove 3d above the lower mouth 13f. For example, the projection 11a can be rotated via movement in the first rotational attachment direction RA so it is moved from an orientation in which its length is aligned with the lower mouth and is parallel in orientation to the shape of the lower mouth 13f to a position in which the projection 11a extends transverse to the lower mouth and crosses the lower mouth 13f within the inner groove 13d located above the lower mouth 13f to be interlocked within the inner groove 13d and prevented from passing out of the inner groove 13d.

In the event the attachment bracket members 11 are desired to be removed from the upper beam member 3, then a rotation in a second rotational direction opposite the first rotational attachment direction RA can cause the projection 11a to move into a parallel orientation with the lower mouth 13f so that the top projection can be passed out of the inner groove 3d and through the lower mouth 13f. In some embodiments, the first rotational attachment direction RA can be a clockwise direction and the second rotational direction can be a counter clockwise direction. In other embodiments, the first rotational attachment direction RA can be a counter clockwise direction and the second rotational direction can be a clockwise direction. As with the attachment process, the disengagement process (or attachment bracket member release process), can also be performed without use of a tool (though a tool such as a wrench can be used to help grip and rotate the attachment bracket member if desired as well).

The body of each attachment bracket member 11 can also include other elements that are all integrally defined in the body or are portions of the body that are integrated into the body via one or more attachment mechanisms (e.g. welding, fasteners, etc.). In a preferred embodiment, each attachment bracket member 11 is formed as an integral body composed of polymeric material that is formed via a molding operation. The polymeric material can be a thermoplastic polyester elastomer material, a thermoplastic polymeric material, a thermoset polymeric material, or other type of polymeric material that may meet a particular set of design criteria.

Figure 6:
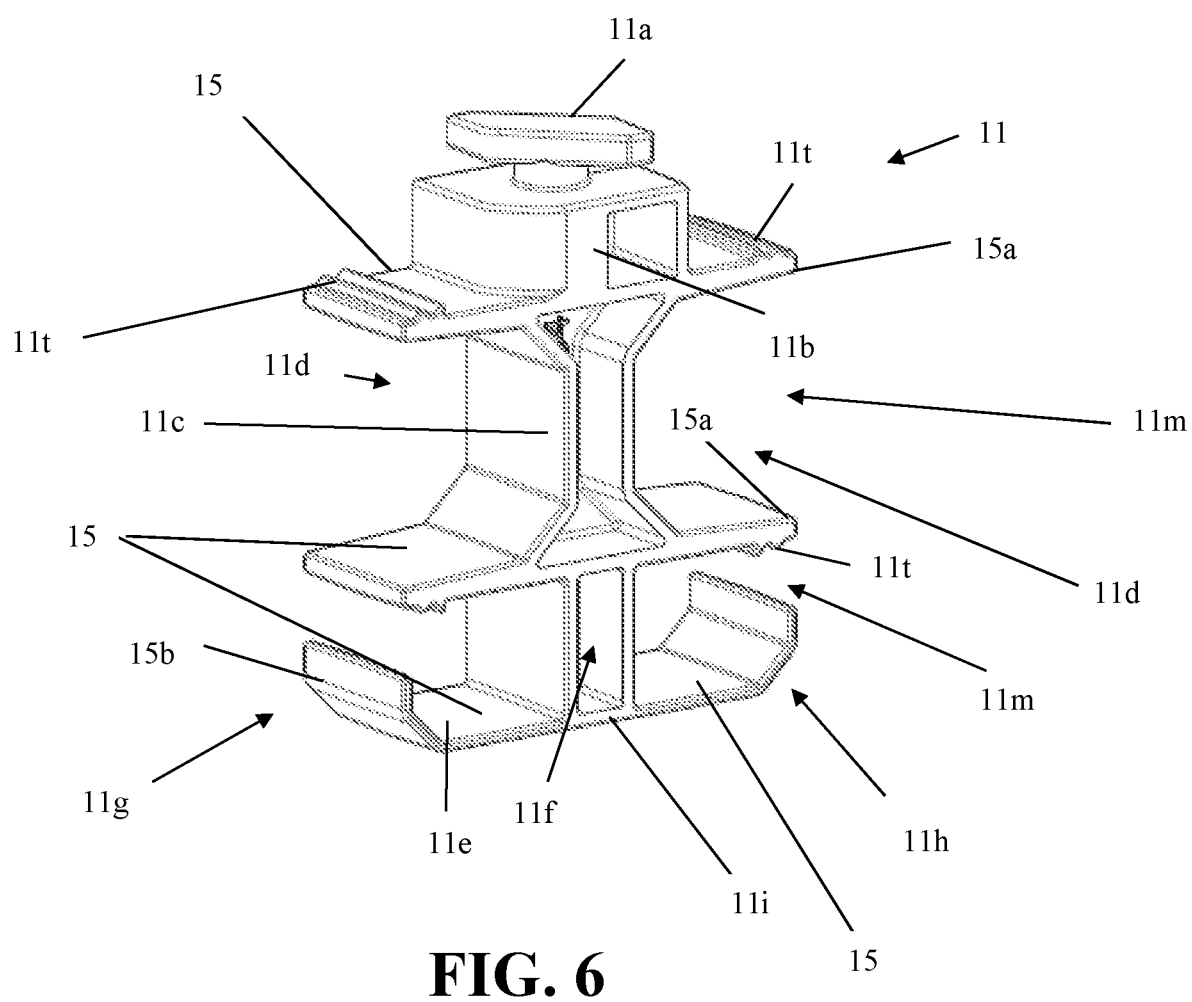
FIG. 6 is a perspective view of the exemplary embodiment of the attachment bracket member 11 of the first exemplary embodiment of the article of furniture.
Figure 7:
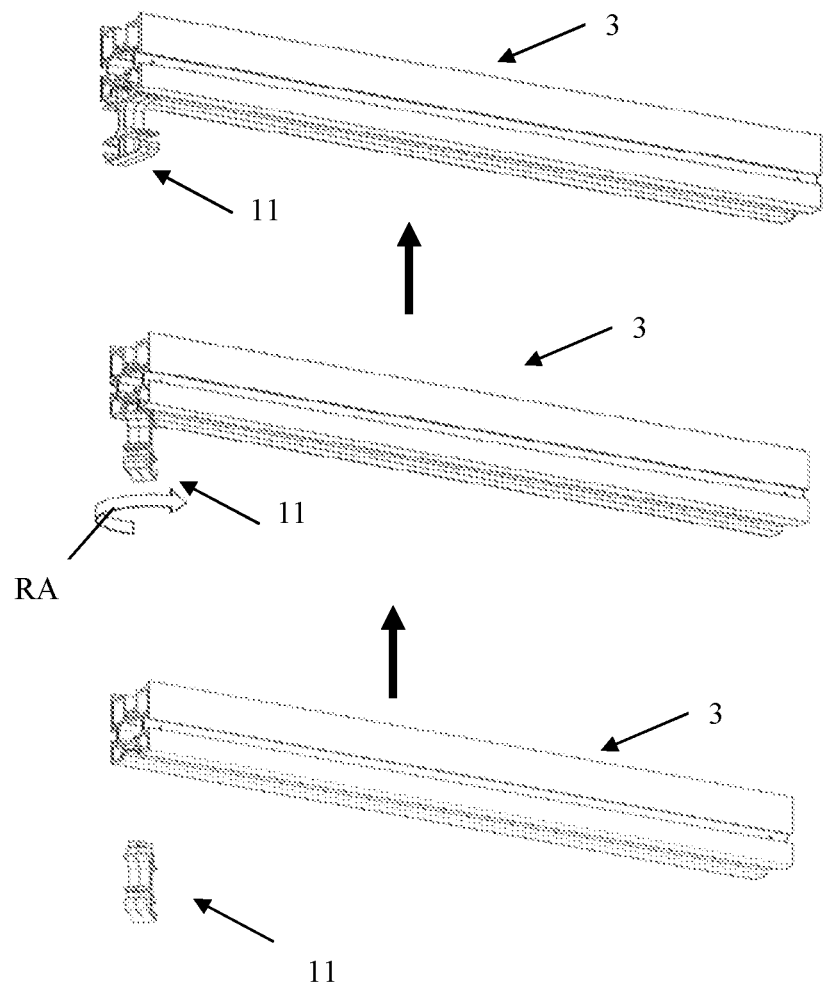
FIG. 7 is a schematic flow chart illustrating an exemplary method for attachment of an exemplary attachment bracket member 11 to the upper beam member 3.

As may best be appreciated from FIGS. 3 and 6, the body of each attachment bracket member 11 can include elements that are defined below the top projection 11a, which can be considered a top upper beam attachment projection. For example, the body of the attachment bracket member 11 can include an upper intermediate portion 11b below the top projection 11a. A first top attachment portion 13 can extend between the upper intermediate portion 11b and the top projection 11a. This first top attachment portion 13 can be sized so it can extend from the inner groove 3d through the lower mouth 13f of the attachment bracket aperture 3aba while the top projection 11a is within the inner groove 3d and rotated into a locked position that prevents the top projection 11a from passing out of the inner groove 3d and lower mouth 3f that is in communication with the inner groove 3d and is below the inner groove 3d. The first top attachment portion 13 can be less thick or wide as compared to the top projection 11a and the lower intermediate portion 11b to facilitate being positioned within the lower mouth 13f and permit rotation of the attachment bracket member 11 while the projection 11a is located within the inner groove 3d.

The upper intermediate portion 11b can be wider than the top projection 11a and be sized so that it can be positioned in or mated within a bottom opening of the attachment bracket aperture 3aba that is in communication with the lower mouth 13f, which can be between the inner groove 3d and the bottom opening of the attachment bracket aperture 3aba. FIG. 3 illustrates an example of how the upper intermediate portion 11b can be positioned within or mated within the bottom opening of the attachment bracket opening 3aba. It should be appreciated that the bottom opening, lower mouth 13f, and inner groove 3d may define the entirety of the attachment bracket opening 3aba in some embodiments.

The body of the attachment bracket member 11 can include a central intermediate portion 11c that extends between the top intermediate portion 11b and a bottom intermediate portion 11f. The bottom end 11i of the bottom intermediate portion 11f can be attached to or integral with bottom arms 15 that extend away from the bottom end 11i to distal end portions 15b at right and left sides of the body. The body of the attachment bracket member 11 can also include a plurality of spaced apart upper arms 15 that extend away from the intermediate portions of the body to distal ends. Each upper arm 15 can extend from the body of the attachment bracket member 11 to a distal end that is away from the right side 11g or left side 11h of the body. Distal end portions 15a of upper arms 15 can include teeth 11t that are defined to contact with and engage teeth 2t that are defined on a portion of a side member 2 for attachment of the side member 2 to the arms of the attachment bracket member 11. The bottom arms 15 can have a distal end portion 15b that are configured to extend upwardly so that the lower arms can have a J-like shape, L-type shape, or " ⌣__⌐ " type shape. The distal tips of the distal end portions 15b of each of the bottom arms 15 may face upwardly toward a respective distal end portion 15a of an upper arm located above that bottom arm 15. Teeth 11t on the distal end portion 15a of an intermediate upper arm located between a top upper arm 15 and a bottom arm 15 on each side of the body may project downwardly toward the distal end of the upwardly extending distal end portion 15b of the bottom arm 15 on that same side of the body. The upper arms 15 can extend linearly away from the body to their distal end portions 15a.

The array of spaced apart arms 15 can define channels for retaining wiring, cables, or other elements. For example, top arms 15 can be spaced apart from intermediate arms 15 to define upper channels 11d on the right and left sides of the body. The bottom arms 15 and intermediate arms 15 can be spaced apart from each other to define lower channels 11e on the right and left sides of the body as well. The upper channels 11d can have an open mouth on their outer side. Each upper channel can have a "C" type cross sectional shape or "C" type sideward shape as may be appreciated from FIG. 3. The size of the open mouth 11m can be defined by the distance between the distal end portion 15a of the top upper arm and the distal end portion 15a of the intermediate upper arm 15. Cabling or wiring can be inserted through the side mouth for being run along the body of the attachment bracket body or being extended through the upper channel 11d.

As compared to the upper channels 11d, the bottom channels 11e can have a different shape that is more rectangular in shape with a smaller side mouth 11m opening through which wires or cables can be inserted for being retained within the bottom channels 11e. This size of each sideward mouth 11m can be defined by the spacing between the distal end portion 15b of the bottom arm and the distal end portion 15a of the immediately adjacent intermediate upper arm 15 above that bottom arm 15.

Figure 3:
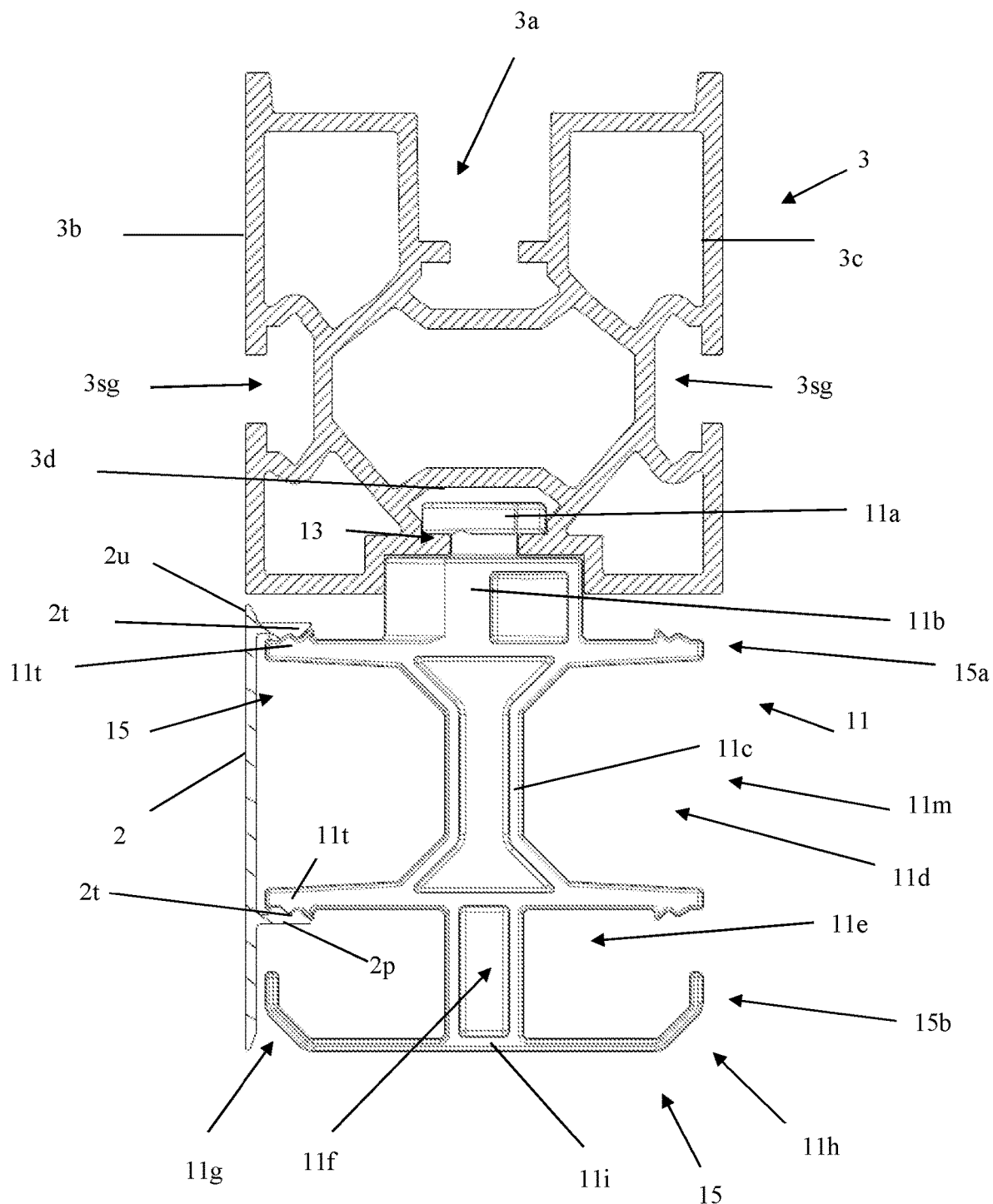
FIG. 3 is a cross-sectional view of the first exemplary embodiment of the article illustrating the attachment of a first outer side member 2 to the upper beam member 3 facilitated via exemplary embodiments of attachment bracket members 11. The second outer side member 2 can be attached to the second side of the upper beam member 3 in the same manner.
Figure 4:
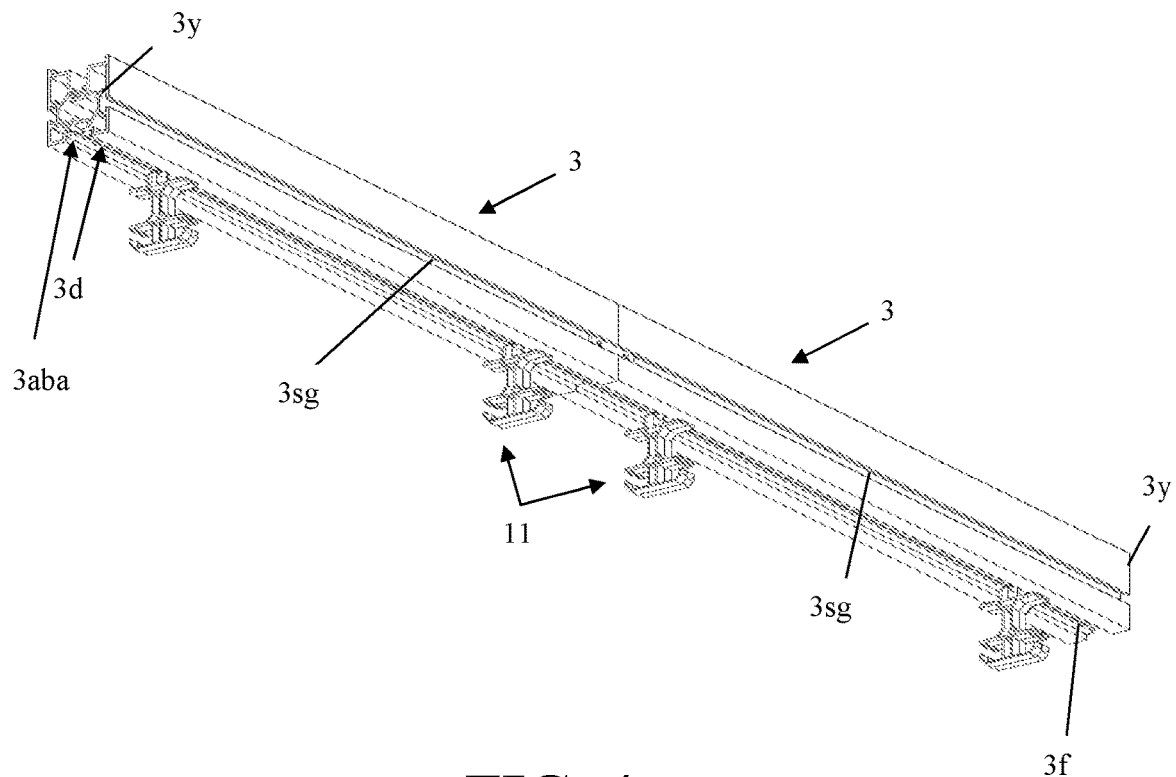
FIG. 4 is a lower fragmentary perspective view of the first exemplary embodiment of the article illustrating exemplary embodiments of the attachment bracket members 11 and the upper beam member 3.
Figure 5:
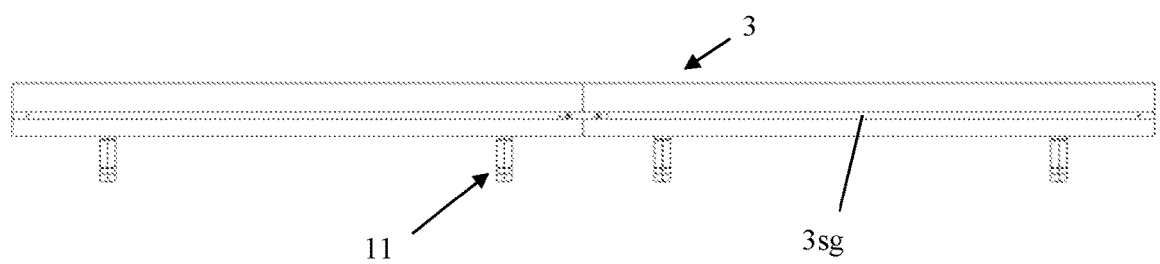
FIG. 5 is a fragmentary side view of the first exemplary embodiment of the article illustrating the positioning of the attachment bracket members 11 when attached to the upper beam member 3 for the first exemplary embodiment of the article of furniture.

As may best be seen from FIG. 3, the teeth 11t of the upper arms 15 can be configured to interlock with teeth 2t defined on projections that extend from the body of a side member 2 to facilitate a toolless attachment of the side member 2 to the upper arms 15 for attaching the side member 2 to the upper beam 3 via the attachment bracket member 11. In other embodiments, other types of interlocking engagement structures can be used for interlockable attachment of the side member 2 to the upper arms 15 in addition to or as an alternative to the use of interlocking teeth 11t and 2t.

In some embodiments, each side member 2 can have an upper projection 2p that extends sidewardly and a lower projection 2p that also extends sidewardly. Each projection 2p can have teeth 2t for engaging teeth of distal end portions 15a of the upper arm to which that projection is to interlock with. For instance the upper projection 2p can have teeth 2t that extend downwardly for engaging teeth 11t of the distal end portion 15a of a top upper arm that extends upwardly. The lower projection 2p can have teeth 2t that extend upwardly for engagement of teeth 11t of the distal end portion 15a of an upper intermediate arm that extend downwardly. The projections 2p and/or upper arms 15 can be configured to resiliently bend or flex to facilitate the positioning of the interlocking teeth 2t and 11t into engagement with each other. This resiliency can allow the projections 2p to be moved along the upper arms 15 and also permit bending to accommodate this positioning. The resiliency of the projections 2p and/or arms 15 can also facilitate a tight interference interlock of the teeth 11t and 2t due to the bias provided by the resiliency of the projections 2p and/or arms 15 to return to the non-bent or unflexed position.

The projections 2p for each side member can each extend along an entirety of the length of the side member 2 or for a substantial portion of the side member 2 (e.g. over 50% of the length of the side member 2, over 80% of the length of the side member 2, over 90% of the length of the side member 2, etc.). In other alternatives, there can be spaced apart top projections 2p and spaced apart bottom projections 2p positioned at different parallel locations for engagement with respective arms of different attachment bracket members 11.

Each side member 2 can be attached to a respective set of upper arms 15 for attachment to a different side of the upper member 3 (e.g. a left side member 2 can be attached to the left upper arms 15 and the right side member 2 can be attached to the right upper arms 15 for each attachment bracket member 11) and have projections 2p that extend along a significant portion of the length of the side member 2 (e.g. entirety of the length, at least 50% of the length, 90% of the length, etc.).

For instance, a first side member 2 for being positioned adjacent the first side 3b of the upper member 3 can have its upper projection 2p positioned for engagement of teeth 2t with teeth 11t of the top upper arm 15 extending outwardly on the first side of the body of attachment bracket member 11 for all the attachment bracket members 11 attached to the upper beam member 3 via the bottom attachment bracket aperture 3aba and their to projections 11a. The first side member 2 for being positioned adjacent the first side 3b of the upper member 3 can have its bottom projection 2p positioned for engagement of teeth 2t with teeth 11t of the intermediate upper arm 15 extending outwardly on the first side of the body of attachment bracket member 11 for all the attachment bracket members 11 attached to the upper beam member 3 via the bottom attachment bracket aperture 3aba and their top projections 11a. A second side member 2 for being positioned adjacent the second side 3c of the upper member 3 can have its upper projection 2p positioned for engagement of teeth 2t with teeth 11t of the top upper arm 15 extending outwardly on the second side of the body of attachment bracket member 11 for all the attachment bracket members 11 attached to the upper beam member 3 via the bottom attachment bracket aperture 3aba and their to projections 11a. The second side member 2 for being positioned adjacent the second side 3c of the upper member 3 can also have its bottom projection 2p positioned for engagement of teeth 2t with teeth 11t of the intermediate upper arm 15 extending outwardly on the second side of the body of attachment bracket member 11 for all the attachment bracket members 11 attached to the upper beam member 3 via the bottom attachment bracket aperture 3aba and their to projections 11a. For such embodiments, the same upper projection 2p may of a particular side member 2 may be attached to all of the top upper arms extending from a second side of all of the attachment bracket members 11 and the same bottom projection 2p may be attached to all of the intermediate upper arm 15 extending from the second side of all the attachment bracket members 11.

In embodiments where the side member 2 has spaced apart parallel top projections 2p and bottom projections 2p, then each projection 2p of a side member 2 can engage a respective upper arm extending from a respective side for a respective attachment bracket member 11. It should be understood that the same upper projection 2p may not be attached to all of the top upper arms of all of the attachment bracket members 11 in such an embodiment and the same bottom projection 2p may not be attached to all of the intermediate upper arm 15 extending from that side of the attachment bracket member 11 for all the attachment bracket members in such an embodiment.

It should be understood that in some embodiments, the bodies of the attachment bracket members 11, can each have a plurality of arms 15 extending from the body that include: a first top arm 15 extending outwardly in a first direction, a second top arm 15 extending outwardly in a second direction that is opposite the first direction at which the first top arm extends, a first intermediate arm 15 extending outwardly that is positioned below the first top arm 15 to define a first upper channel 11d, a second intermediate arm 15 extending outwardly that is positioned below the second top arm 15 to define a second upper channel 11d, a first bottom arm 15 extending outwardly that is positioned below the first intermediate arm 15 to define a first bottom channel 11e, and a second bottom arm 15 extending outwardly that is positioned below the second intermediate arm 15 to define a second bottom channel 11e. The first direction at which the first top arm, first intermediate arm, and first bottom arm extend may be between 170°-190° (e.g. 180°) relative to the second direction at which the second top arm, second intermediate arm, and second bottom arm extend (e.g. the first direction may have the first arms extend on the left side of the body of the attachment bracket member 11 and the second direction may have the second arms extend on the right side of the body).

A distal end portion 15a of the first top arm 15 can have teeth 11t to interlock with teeth 2t of the upper projection 2p of the first side member 2; a distal end portion 15a of the second top arm 15 can have teeth 11t to interlock with teeth 2t of an upper projection 2p of the second side member 2, a distal end portion 15a of the first intermediate arm 15 can have teeth to interlock with teeth 2t of a bottom projection 2p of the first side member, and a distal end portion 15a of the second intermediate arm 15 can have teeth 11t to interlock with teeth 2t of a bottom projection 2p of the second side member 2 for toolless attachment of the first and second side members 2 to each of the attachment bracket members 11 without requiring use of separate fasteners (e.g. the attachment can also be fastenerless without requiring use of separate screws, nails, bolts, etc.).

The upper projection 2p of each side member 2 can also include an upwardly extending lip 2u that extends above the teeth 2t for positioning adjacent to an outer side of the upper beam member 3. This lip 2u configuration can facilitate a tight positioning of the side member 2 adjacent to a side of the upper beam member 3 to provide a desired aesthetic affect to the arrangement of the side member 2 at the side of the upper beam member 3. A minimal gap can be maintained between a bottom of the upper beam member 3 and a top of the side member 2 via use of the lip 2u.

In some embodiments, the upper beam member 3 can have a first bottom opened groove extending along its bottom near the first side 3b of the upper beam member 3 and also a second bottom opened groove extending along its bottom near the second side 3c of the upper beam member to accommodate the upper lips 2u of first and second side members 2. Such grooves can help facilitate positioning of the side members 2 and positioning of the distal upper ends of the lips 2u so they can be positioned very close to the bottom of the upper beam member 3 adjacent the first or second side of the upper beam member 3 to minimize the size of the gap between the upper beam member 3 and the side member 2.

Engagement between the upper lip 2u and the portion of the upper beam member 3 can also help provide a locating feature to allow an installer to intuitively position the side member relative to the upper beam member 3 for projections 2p to have their teeth 2t engage the teeth t of the upper arms 15. When the upper lip 2u contacts the inner sidewall of a groove defined in the bottom of the upper beam member 3, the installer can know that the teeth 2t of the projections 2p can be moved into engagement with the teeth 11t of the arms 15.

The side members 2 can be positioned on first and second sides of the upper beam member 3 to define a bottom opening 21 between the spaced apart side members. The bottoms of each of the attachment bracket members 11 may be visible via this bottom opening 21 in spaced apart positions along that opening. In some embodiments, a bottom cover (not shown) can be attached to the side members 2 to cover this bottom opening 21. The bottom cover can alternatively (or also) be attached to the bottoms of the attachment bracket members 11 for covering this bottom opening 21. The bottom cover can have a length and shape for extending along the entirety of the bottom opening 21 for covering the opening or may be formed from multiple cover elements that are each attached to cover a respective portion of the bottom opening.

Embodiments of the article of furniture 1 can be configured to allow an installer to go to a site that may receive a box of components of the article and quickly assemble the article without having to use mechanical tools for attaching the side members 2 and attachment bracket members 11 to the upper beam member 3. Further, the configuration of the upper and lower channels 11d and 11e and the structure of the side members 2 can allow wiring for outlets to be easily routed along a length of the upper beam member 3 and along the side members 2 by providing easy access to the channels for a user to insert and position the wiring in the upper and lower channels for then retaining that wiring within those channels. This can permit the installation and assembly of the article that may support providing electricity and/or data connections to other items to occur very quickly without the use of many tools or fasteners and, in some embodiments, without the use of any tools or fasteners (e.g. bolts and screws, drills and/or screwdrivers).

Once the article of furniture 1 is assembled or during the assembly of the article of furniture 1, terminal ends of the wiring can be routed away from the article 1 via bottom opening 21 or via inner conduits defined in one or both legs 4. One or more plugs or connectors of the terminal ends of the wiring can be plugged or unplugged from ports or outlets in a floor or wall of the work area to provide a connection for powering the outlets 7 and/or providing the data connection via the outlets 7. These one or more plugs can then be decoupled from an outlet to support movement of the article to a new location and then plugged into another outlet near the new location of the article. This type of functionality can allow the article to support adjustment of work area layouts to adjust the organization of different work spaces within the work area that may be needed (e.g. changing a layout from a densely packed set of work spaces to a more spaced apart set of work spaces to provide for improved social distancing, changing the layout from a highly social distanced set of work spaces to a more densely packed set of work spaces, etc.).

The bottom or bottom arms 15 of each attachment bracket member 11 can also be utilized to help facilitate positioning of shelving units or other structure below the upper beam member 3 and below the side members 2. For instance, shelving can be hung from the bottom arm members 15 for positioning below the side members 2 and the upper beam member 3. The side groove 3sg of the upper beam member 3 can also be utilized to help facilitate attachment of other structures to the upper beam member 3. Privacy screens and/or shelving could be attached to the upper beam member 3 via the side groove 3sg, for example. Examples of such structures that can be attached via the side groove 3sg are disclosed in U.S. Provisional Patent Application No. 63/041, 152, which was filed on Jun. 19, 2020 (the entirety of which is incorporated herein by reference).

It should be understood that other modifications to the article of furniture 1 can be made to meet a particular set of design criteria. For example, it is contemplated that a particular feature described, either individually or as part of an embodiment, can be combined with other individually described features, or parts of other embodiments. The elements and acts of the various embodiments described herein can therefore be combined to provide further embodiments. As another example, article can be attached to a display, at least one privacy screen, and/or one or more shelf units. The number of outlets 7 and the outlet configurations (e.g. power only, power and USB, data and electricity outlets, etc.) can be adjusted to meet a particular set of design criteria or objectives. The body of the attachment bracket members 11 can have different sizes and shapes with a different arrangement of hollowed portions or recess defined therein to account for weight and strength requirements that may exist for a particular set of design criteria. As another example, the size and shape of the legs 4, utilization of feet 5, size and shape of upper beam member 3, attachment bracket members 11, arms 15, distal end portions 15a and 15b, side members 2, and side member projections 2p can be any of a number of different sizes and shapes to meet a particular set of design criteria and provide a desired ornamental appearance. Therefore, while certain exemplary embodiments of the article of furniture 1, attachment bracket members 11, and methods of making and using the same have been discussed and illustrated herein, it is to be distinctly understood that the invention is not limited thereto but may be otherwise variously embodied and practiced within the scope of the following claims.

What is claimed is:

1. An article of furniture comprising:
   an upper beam member;
   a first side member;
   a second side member;
   a plurality of attachment bracket members connecting the first side member to the upper beam member adjacent a first side of the upper beam member and also connecting the second side member to the upper beam member adjacent a second side of the upper beam member,
   wherein the attachment bracket members each have:
      a body;
      a plurality of arms extending from the body, the arms comprising:
         a first top arm extending outwardly,
         a second top arm extending outwardly in a direction that is opposite the first top arm;
         a first intermediate arm extending outwardly that is positioned below the first top arm to define a first upper channel;
         a second intermediate arm extending outwardly that is positioned below the second top arm to define a second upper channel;
         a first bottom arm extending outwardly that is positioned below the first intermediate arm to define a first bottom channel; and
         a second bottom arm extending outwardly that is positioned below the second intermediate arm to define a second bottom channel.

2. The article of claim 1, wherein the attachment bracket members are configured to be coupled to the upper beam member via a toolless attachment mechanism.

3. The article of claim 2, wherein the attachment bracket members are configured to be coupled to the first and second side members via a toolless attachment mechanism.

4. The article of claim 1, wherein the upper beam member is sized and configured to receive an upper lip of an upper projection of the first side member to define a gap between a bottom of the upper beam member and the upper lip of the first side member and the upper beam member is sized and configured to receive an upper lip of an upper projection of the second side member to define a gap between a bottom of the upper beam member and the upper lip of the second side member.

5. The article of claim 1, comprising:
   outlets positioned in the first side member and outlets positioned in the second side member.

6. The article of claim 5, wherein the outlets are configured for transmission of electricity and/or data.

7. The article of claim 1, comprising:
   a base or a plurality of legs to support the upper beam member above a floor.

8. The article of claim 7, wherein each of the legs is attached to at least one foot.

9. The article of claim 1, wherein a body of each of the attachment bracket members is an integral body comprised of polymeric material.

10. The article of claim 9, wherein:
    a distal end portion of the first top arm has teeth to interlock with teeth of an upper projection of the first side member; a distal end portion of the second top arm has teeth to interlock with teeth of an upper projection of the second side member, a distal end portion of the first intermediate arm has teeth to interlock with teeth of a bottom projection of the first side member, and a distal end portion of the second intermediate arm has teeth to interlock with teeth of a bottom projection of the second side member for toolless attachment of the first and second side members to each of the attachment bracket members.

11. The article of claim 10, wherein the body also has a top projection for insertion into an inner groove of the upper beam member so rotation of the top projection interlocks the top projection within the inner groove.

12. The article of claim 9, wherein the body has a top projection for insertion into an inner groove of the upper beam member so rotation of the body rotates the top projection to interlock the top projection within the inner groove.

13. An article of furniture comprising:
    an upper beam member;
    a first side member;
    a second side member;
    a plurality of attachment bracket members connecting the first side member to the upper beam member adjacent a first side of the upper beam member and also connecting the second side member to the upper beam member adjacent a second side of the upper beam member, the attachment bracket members being configured to be coupled to the first and second side members via a toolless attachment mechanism and are configured to be coupled to the upper beam member via a toolless attachment mechanism; wherein the attachment bracket members each have:
       a body having a top projection for insertion into an inner groove of the upper beam member so rotation of the top projection interlocks the top projection within the inner groove;
    a plurality of arms extending from the body, the arms comprising:
       a first top arm extending outwardly,
       a second top arm extending outwardly in a direction that is opposite the first top arm;
       a first intermediate arm extending outwardly that is positioned below the first top arm to define a first upper channel;
       a second intermediate arm extending outwardly that is positioned below the second top arm to define a second upper channel;
       a first bottom arm extending outwardly that is positioned below the first intermediate arm to define a first bottom channel; and
       a second bottom arm extending outwardly that is positioned below the second intermediate arm to define a second bottom channel.

14. The article of claim 13, wherein a distal end portion of the first top arm has teeth to interlock with teeth of an upper projection of the first side member; a distal end portion of the second top arm has teeth to interlock with teeth of an upper projection of the second side member, a distal end portion of the first intermediate arm has teeth to interlock with teeth of a lower projection of the first side member, and a distal end portion of the second intermediate arm has teeth to interlock with teeth of a lower projection of the second side member for toolless attachment of the first and second side members to each of the attachment bracket members.

15. An article of furniture comprising:
an upper beam member;
a first side member;
a second side member;
a plurality of attachment bracket members connecting the first side member to the upper beam member adjacent a first side of the upper beam member and also connecting the second side member to the upper beam member adjacent a second side of the upper beam member,
wherein the attachment bracket members each have:
a body;
a plurality of arms extending from the body, the arms comprising:
a first top arm extending outwardly,
a second top arm extending outwardly in a direction that is opposite the first top arm;
a first intermediate arm extending outwardly that is positioned below the first top arm to define a first upper channel;
a second intermediate arm extending outwardly that is positioned below the second top arm to define a second upper channel;
a first bottom arm extending outwardly that is positioned below the first intermediate arm to define a first bottom channel; and
a second bottom arm extending outwardly that is positioned below the second intermediate arm to define a second bottom channel; and
wherein a distal end portion of the first top arm has teeth to interlock with teeth of an upper projection of the first side member; a distal end portion of the second top arm has teeth to interlock with teeth of an upper projection of the second side member, a distal end portion of the first intermediate arm has teeth to interlock with teeth of a bottom projection of the first side member, and a distal end portion of the second intermediate arm has teeth to interlock with teeth of a bottom projection of the second side member for toolless attachment of the first and second side members to each of the attachment bracket members.

16. A method of installing an article of furniture, the method comprising:
providing an upper beam member having a top, a first side, a second side opposite the first side, and a bottom, the bottom defining an inner groove that is in communication with a lower mouth;
positioning a top projection of an attachment bracket member through the lower mouth so that the top projection is positioned within the inner groove of the upper beam member; and
rotating the attachment bracket member while the top projection is within the inner groove in a first rotational attachment direction to interlock the top projection within the inner groove to prevent the top projection from passing through the lower mouth;
wherein the attachment bracket member comprises:
a body having the top projection;
a plurality of arms extending from the body, the arms comprising:
a first top arm extending outwardly,
a second top arm extending outwardly in a direction that is opposite the first top arm;
a first intermediate arm extending outwardly that is positioned below the first top arm to define a first upper channel;
a second intermediate arm extending outwardly that is positioned below the second top arm to define a second upper channel;
a first bottom arm extending outwardly that is positioned below the first intermediate arm to define a first bottom channel; and
a second bottom arm extending outwardly that is positioned below the second intermediate arm to define a second bottom channel.

17. The method of claim 16, comprising:
attaching a first side member to the attachment bracket member adjacent to the first side of the upper beam member.

18. The method of claim 17, comprising:
attaching a second side member to the attachment bracket member adjacent to the second side of the upper beam member.

19. The method of claim 16, comprising:
routing wiring along the attachment bracket member.

20. The method of claim 17, wherein the rotating of the attachment bracket member while the top projection is within the inner groove in the first rotational attachment direction is performed without use of a mechanical tool and the attaching of the first side member to the attachment bracket member is performed without use of a mechanical tool.

* * * * *